April 10, 1934. W. B. POWELL Re. 19,134

CONTAINER FOR PAPER ROLLS

Original Filed April 19, 1930

Inventor
W. B. Powell
by J. Edw. Maybee
ATTY.

Reissued Apr. 10, 1934

Re. 19,134

UNITED STATES PATENT OFFICE 19,134

CONTAINER FOR PAPER ROLLS

William B. Powell, Hamilton, Ontario, Canada, assignor to Appleford Paper Products Limited, Hamilton, Ontario, Canada Original No. 1,847,896, dated March 1, 1932, Serial No. 445,654, April 19, 1930. Application for reissue March 16, 1933, Serial No. 661,165

14 Claims. (Cl. 206—58)

This invention relates to boxes particularly adapted for holding rolls of wrapping paper in such a manner that any desired length of the paper may be drawn out as required and cut off against a tearing edge formed on or carried by the box, and my object is to devise a simple and efficient box for this purpose which will be cheap to produce, convenient and efficient in operation and which may be stored in knock-down condition.

I attain my object by means of a construction which may be briefly described as follows. The box comprises an open topped body portion, and a cover hinged to the body portion and provided with a depending front and ends. The parts are preferably integral and formed from a folded blank.

A special feature of the cover is that its front is formed of a part integral with the top and folded on itself to embrace flaps integral with the ends, the inner part of the front being formed with a secondary flap adapted to lie against the under surface of the top.

Another object is the provision of an inexpensive cardboard container carrying a paper roll from which paper is withdrawn through the passageway formed between the front of the cover and the front of the lower portion of the container. The front wall of the cover is preferably folded inwardly upon itself providing an upwardly angularly extending primary flap which yieldingly urges the paper web against the front wall of the lower portion of the container and acts as a brake upon the movement of the paper web while permitting the withdrawal thereof. The folded edge provides a hard smooth reinforced cutting edge against which the paper may be severed. This infolded primary flap is tensioned upon closure of the cover and, upon release of the cover, it tends to assist in lifting the cover to expose the end of the paper web so that it may be readily grasped for further withdrawal.

A special feature of the box is that the ends of the front and back are provided with interlocking flaps and that these flaps are embraced by the parts of end members folded on themselves and preferably provided with flaps adapted to lie against the bottom of the box.

Figures 1, 2, 3:
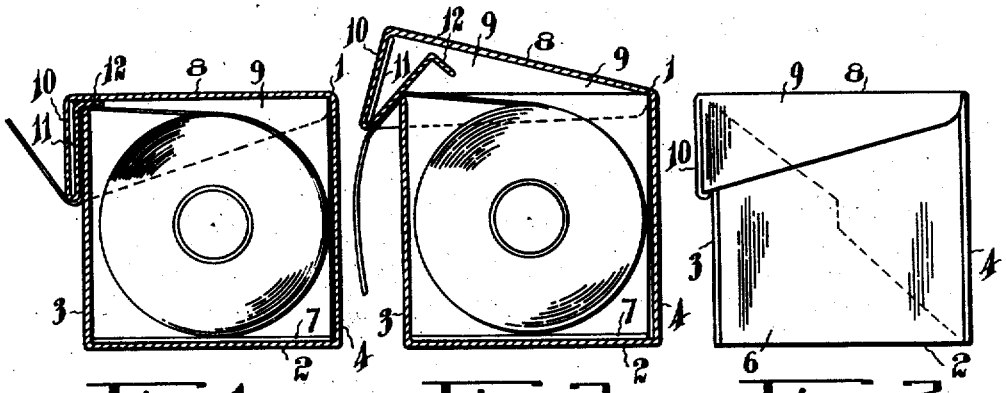
Figures 4, 5:
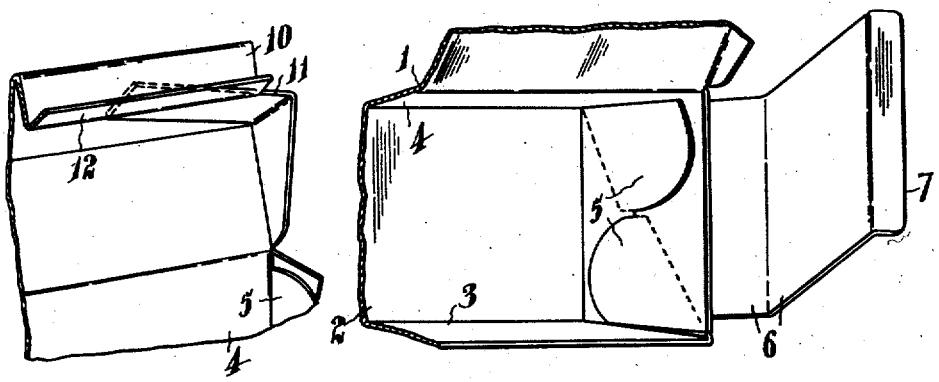
Figure 6:
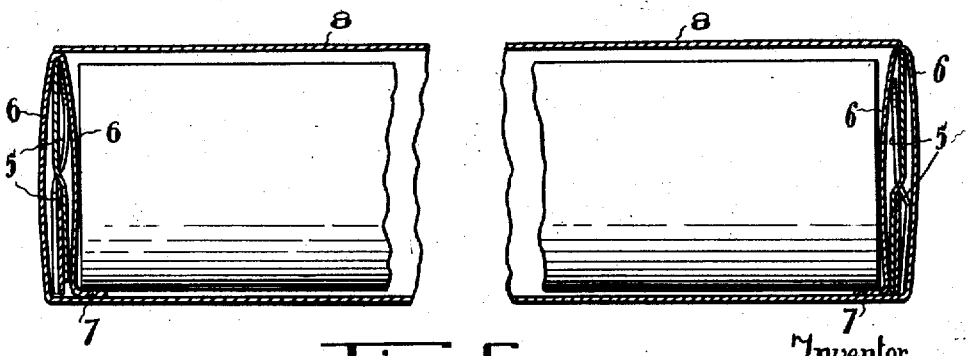

The invention is hereinafter more fully described, and is illustrated in the accompanying drawing in which Figure 1 is a cross section of the container constructed in accordance with my invention with the cover in closed position, Figure 2 is a similar view with the cover partly raised, Figure 3 is an end view of the container, Figure 4 a perspective detail showing more particularly one corner of the cover partly unfolded;

Figure 5 a perspective view of part of the container showing more particularly one end with the parts partly unfolded, and Figure 6 a longitudinal section partly broken away.

In the drawing like numerals of reference indicate corresponding parts in the different figures.

Referring to the drawing, it will be seen that the container comprises two main parts, an open top box and a cover, the one hingedly connected to the other at the top rear edge of the box. Preferably these two parts are integral, being formed from a cardboard blank which will be scored along the line 1 to facilitate bending at that point.

The open top box comprises a bottom 2, front and back walls 3 and 4 integral with the bottom, end flaps 5 integral with the front and back walls and ends 6 integral with the bottom and folded on themselves to embrace the end flaps and thus stiffen the box ends, and provide smooth unbroken outside surface for printing. The end flaps, as will be seen particularly on reference to Figs. 5 and 6, are interlocked in a known manner to hold the front and back walls in the set up position. Preferably each end 6 has a flap 7 formed on its free edge adapted to lie on the bottom of the box. These flaps support the ends of the roll of paper and lessen the frictional resistance to the turning of the roll as compared with contact for its full length on the bottom of the box.

The cover comprises the top 8, the ends 9, preferably triangular and integral with the top, and the front 10 integral with the front edge of the top. This front is folded on itself forming a primary flap adapted to embrace the end flaps 11 which are integral with the ends 9, while the front as a whole is held rigidly positioned by the ends 9. A secondary flap 12 is formed on the free edge of the primary flap or the inner part of the double front, which secondary flap is adapted to lie against the under surface of the top of the cover as shown in Figure 1. The fold of this double front forms a stiff reinforced tearing edge which makes it unnecessary to use metal to form the tearing edge. This fold forms a smooth hard cutting edge superior to the raw edge of a single thickness of cardboard. While the flap 12 might be secured to the under surface of the top 8 I prefer to leave it free, as shown in Figure 2, as advantage may thus be taken of the springiness of the folded front to hold the portion of a roll of paper which is being drawn out against the free edge of the front of the box, thus tending to prevent its passing back into the box. Another advantage in leaving the double front free is that the lid will retain a slightly raised position when desired to give access to the free end of the web drawn off from the roll. Within the lower portion of the container is disposed for unwinding a roll of paper as shown in Figures 1 and 2.

The element 10 as shown in Fig. 1 is folded upon itself and due to its inherent resilience, bears upon the front face of wall 3, exerting a force normal to that wall which may be assumed to act at a point midway of the depending dimension of the element 10. The force thus exerted gives rise to an equal and opposite reaction by the wall 3 upon element 10. Treating the cover portion of the box as a free body and taking a summation of moments about the hinge axis at 1, the reaction force of the wall 3 upon the element 10 produces a clockwise moment about axis 1 equivalent to the product of the force above in pounds and half the depth of the depending element 10 in inches. The opposing moments are due to the friction between element 10 and wall 3, and the weight of the cover multiplied by their respective moment arms. The factors of force due to resilience, the coefficient of friction between the surfaces, weight and the length of the moment arms, are so correlated as to give a resultant clockwise moment which will effectively raise the cover.

From the above description it will be seen that I have devised a container which will satisfactorily attain the objects of my invention as set out in the preamble of this specification.

I claim:

1. A container comprising an open top box and a cover having a hinging connection with the back wall of the box, said cover being formed of an integral sheet of cardboard folded to form a top, ends, flaps at the front edges of the ends, and a front folded on itself to embrace the end flaps, the fold forming a tearing edge against which paper drawn from a supply within the container may be torn, and the inner part of the double front being free at its inner edge whereby said part may resiliently engage the free edge of the front of the container to act as a brake against the paper drawn from the said supply.

2. A container comprising an open top box and a cover having a hinging connection with the back wall of the box, said cover being formed of an integral sheet of cardboard folded to form a top, ends, flaps at the front edges of their ends, a front folded on itself to embrace the end flaps, the fold forming a tearing edge against which paper drawn from a supply within the container may be torn, and a secondary flap formed on the free edge of the inner part of the double front adapted to lie against the under surface of the top of the cover, the said inner part of the double front being free at its inner edge whereby said part may resiliently engage the free edge of the front of the container to act as a brake against the paper drawn from the said supply.

3. In combination, a dispensing container comprising a box like lower portion having a bottom, a front and a rear wall and end walls, a cover portion hingedly connected to the rear wall of the lower portion and having a top, a front wall and end walls, said cover portion adapted to close over the lower portion with the front wall of the cover overlapping the front wall of the lower portion and spaced slightly therefrom forming a passageway therebetween, a roll of paper disposed within the lower portion for withdrawal of the paper web from the roll through said passageway, said front wall of the cover having a flap turned inwardly toward the top of the cover at an angle to said front wall and adapted to yieldingly urge the web of paper against the front wall of said lower portion.

4. In combination, a dispensing container comprising an integral paper blank folded to form a box like lower portion having a bottom, a front and a rear wall and end walls, and a cover portion hingedly connected to the rear wall of the lower portion and having a top, a front wall and end walls, said cover portion adapted to close over the lower portion with the front wall of the cover overlapping the front wall of the lower portion and spaced slightly therefrom forming a passageway therebetween, a roll of paper disposed within the lower portion for withdrawal of the paper web from the roll through said passageway, said blank including a part adapted to be placed under tension by the closing of the cover over said lower portion operable upon release of the cover following such closure to tend to lift the cover with respect to the lower portion.

5. In combination, a dispensing container comprising an integral paper blank folded to form a box like lower portion having a bottom, a front and a rear wall and end walls, and a cover portion hingedly connected to the rear wall of the lower portion and having a top, a front wall and end walls, said cover portion adapted to close over the lower portion with the front wall of the cover overlapping the front wall of the lower portion and spaced slightly therefrom forming a passageway therebetween, a roll of paper disposed within the lower portion for withdrawal of the paper web from the roll through said passageway, and means arranged between the cover and said lower portion and formed from an integral part of the blank adapted, upon release of the cover following closure thereof over the lower portion, to exert a tendency to separate said portions of the container.

6. In combination, a dispensing container comprising an integral paper blank folded to form a box like lower portion having a bottom, a front and a rear wall and end walls, and a cover portion hingedly connected to the rear wall of the lower portion and having a top, a front wall and end walls, said cover portion adapted to close over the lower portion with the front wall of the cover overlapping the front wall of the lower portion and spaced slightly therefrom forming a passageway therebetween, a roll of paper disposed within the lower portion for withdrawal of the paper web from the roll through said passageway, said front wall of the cover being folded inwardly toward the top of the cover at an angle to said front wall to urge the paper web against the front wall of said lower portion and to exert a tendency to lift the cover upon its release following closure thereof.

7. In combination, a dispensing container comprising a box like lower portion having a bottom, a front and a rear wall and end walls, a cover portion hingedly connected to the rear wall of the lower portion and having a top, a front wall and end walls, said cover portion adapted to close over the lower portion with the front wall of the cover overlapping the front wall of the lower portion and spaced slightly therefrom forming a passageway therebetween, a roll of paper disposed within the lower portion for withdrawal of the paper web from the roll through said passageway, and means other than the hinge connection between said two portions of the container adapted to be placed under tension by the closing of the cover over said lower portion operable on release of the cover following such closure to exert a tendency to elevate the cover with respect to said lower portion to expose the end of the web of paper.

8. In combination, a dispensing container comprising a box like lower portion having a bottom, a front and a rear wall and end walls, a cover portion hingedly connected to the rear wall of the lower portion and having a top, a front wall and end walls, said cover portion adapted to close over the lower portion with the front wall of the cover overlapping the front wall of the lower portion and spaced slightly therefrom forming a passageway therebetween, a roll of paper disposed within the lower portion for withdrawal of the paper web from the roll through said passageway, and means arranged between the front wall of the cover and the front wall of the lower portion adapted to be placed under tension by the closing of the cover over the lower portion operable, upon release of the cover following its closure, to exert a tendency to elevate the cover with respect to the lower portion.

9. In combination, a dispensing container comprising a box like lower portion having a bottom, a front and a rear wall and end walls, a cover portion hingedly connected to the rear wall of the lower portion and having a top, a front wall and end walls, said cover portion adapted to close over the lower portion with the front wall of the cover overlapping the front wall of the lower portion and spaced slightly therefrom forming a passageway therebetween, a roll of paper disposed within the lower portion for withdrawal of the paper web from the roll through said passageway, said front wall of the cover being folded inwardly and upwardly and adapted to yieldingly urge the paper web against the front wall of the lower portion and to be placed under tension by the closing of the cover over the lower portion to exert a tendency to separate the cover and lower portion upon release of the cover following closure.

10. In combination, a dispensing container comprising a box like lower portion having a bottom, a front and a rear wall and end walls, a cover portion hingedly connected to the rear wall of the lower portion and having a top, a front wall and end walls, said cover portion adapted to close over the lower portion with the front wall of the cover overlapping the front wall of the lower portion and spaced slightly therefrom forming a passageway therebetween, a roll of paper disposed within the lower portion for withdrawal of the paper web from the roll through said passageway, said front wall of the cover having a smooth hard cutting edge formed by folded material against which the paper web may be severed.

11. In combination, a dispensing container comprising an integral paper blank folded to form a box like lower portion having a bottom, a front and a rear wall and end walls, and a cover portion hingedly connected to the rear wall of the lower portion and having a top, a front wall and end walls, said cover portion adapted to close over the lower portion with the front wall of the cover overlapping the front wall of the lower portion and spaced slightly therefrom forming a passageway therebetween, a roll of paper disposed within the lower portion for withdrawal of the paper web from the roll through said passageway, said blank including a part integral with the cover and lower portion adapted to be placed under tension by the closing of the cover over the lower portion to urge the paper web against said lower portion and operable, upon release of the cover following such closure, to tend to lift the cover to expose the end of the paper web, the lower edge of the front of the cover being stiffened and reinforced to form a hard smooth cutting edge against which the paper web may be severed.

12. The invention as defined in claim 9 characterized in that the front wall of the cover retains sufficient flexibility to permit it to be deflected inwardly to urge the paper web against the front wall of the lower portion of the container.

13. In combination, a dispensing container comprising a box like lower portion having a bottom, a front and a rear wall and end walls, a cover portion hingedly connected to the rear wall of the lower portion and having a top, a front wall and end walls, a roll of paper disposed within the lower portion for withdrawal of the paper web from the roll through the passageway between the front wall of the cover and the front wall of the lower portion, and means other than the hinge connection between the cover and said lower portion adapted to normally hold said cover partially elevated, said means being yieldable to permit the cover to be closed completely over said lower portion.

14. In combination, a dispensing container comprising a box like lower portion having a bottom, a front wall, a rear wall and end walls, a cover portion hingedly connected to the rear wall of the lower portion and having a top, a front wall and end walls, a roll of paper disposed within said lower portion for withdrawal of the paper web from the roll through the passageway between the front wall of the cover and the front wall of the lower portion, and means other than the hinge connection between the cover and said lower portion operable to normally hold said cover partially elevated with the front wall of the cover slightly overlapping the front wall of the lower portion, said means being resistingly yieldable to permit the cover to be closed over the lower portion so that the front wall of the cover completely overlaps the front wall of the lower portion.

WILLIAM B. POWELL.